United States Patent
Wirt

(10) Patent No.: US 8,061,716 B2
(45) Date of Patent: Nov. 22, 2011

(54) LOCKING JOINT SEAL

(75) Inventor: Dale Wirt, Findlay, OH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 870 days.

(21) Appl. No.: 12/024,612

(22) Filed: Feb. 1, 2008

(65) Prior Publication Data
US 2009/0194948 A1    Aug. 6, 2009

(51) Int. Cl.
*F16J 15/00*    (2006.01)
(52) U.S. Cl. .......... 277/631; 277/547; 277/497; 277/499
(58) Field of Classification Search .................. 277/345, 277/592, 496–499, 631, 546, 547
See application file for complete search history.

(56) References Cited

U.S. PATENT DOCUMENTS

| | | | | |
|---|---|---|---|---|
| 210,848 A * | 12/1878 | Gingras | ................ | 411/531 |
| 1,172,678 A * | 2/1916 | Davidson | ................ | 277/446 |
| 1,271,077 A * | 7/1918 | Probasco | ................ | 277/499 |
| 1,348,146 A * | 8/1920 | Beecher | ................ | 277/497 |
| 1,363,281 A * | 12/1920 | Setter | ................ | 277/499 |
| 1,485,128 A * | 2/1924 | Small | ................ | 277/469 |
| 1,489,464 A * | 4/1924 | Small | ................ | 277/445 |
| 1,535,552 A * | 4/1925 | Small | ................ | 277/445 |
| 1,589,482 A * | 6/1926 | Penberthy | ................ | 277/498 |
| 2,485,862 A * | 10/1949 | Caza | ................ | 277/496 |
| 2,759,777 A * | 8/1956 | Anderson | ................ | 384/487 |
| 2,807,509 A * | 9/1957 | Anderson | ................ | 384/487 |
| 2,886,479 A * | 5/1959 | Riedel | ................ | 156/268 |
| 2,937,061 A * | 5/1960 | Folkerts | ................ | 277/468 |
| 3,784,215 A * | 1/1974 | Ruthenberg | ................ | 277/496 |
| 4,533,149 A * | 8/1985 | Vater et al. | ................ | 277/499 |
| 4,881,455 A * | 11/1989 | Hirose | ................ | 92/248 |
| 5,513,857 A * | 5/1996 | Watanabe et al. | ................ | 277/469 |
| 5,934,680 A * | 8/1999 | Kakehi et al. | ................ | 277/499 |
| 7,010,844 B2 | 3/2006 | Pekarsky et al. | | |
| 2009/0051126 A1 * | 2/2009 | King et al. | ................ | 277/631 |
| 2009/0230627 A1 * | 9/2009 | King et al. | ................ | 277/314 |

* cited by examiner

*Primary Examiner* — Alison Pickard
(74) *Attorney, Agent, or Firm* — Ronald W. Wangerow, Esq.; Harness, Dickey & Pierce, P.L.C.

(57) ABSTRACT

A locking joint seal includes a ring-shaped body made from poly tetra fluoroethylene and having a first end and a second end. The first and second ends each include mutually engageable first and second locking features. The first locking feature including a first axially extending portion overlapping a second axially extending portion of the second locking feature in an assembled condition.

21 Claims, 2 Drawing Sheets

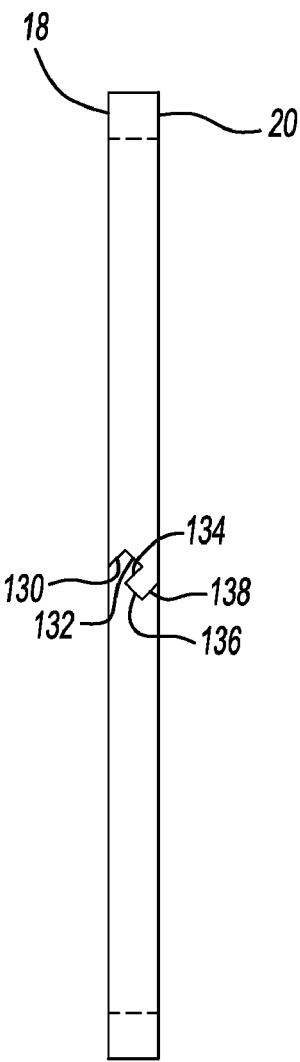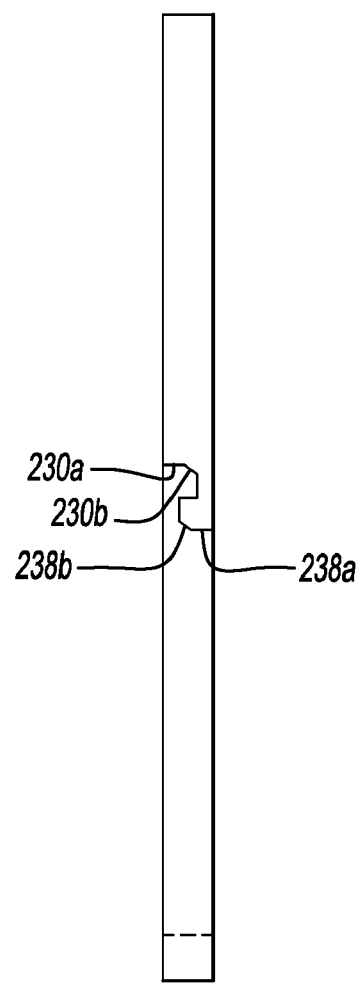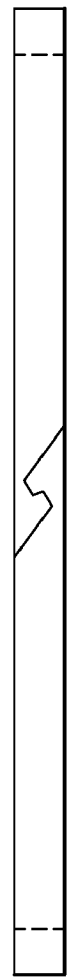
*Fig-3*     *Fig-4*     *Fig-5*

LOCKING JOINT SEAL

FIELD

The present disclosure relates to seals and more particularly to a locking joint seal.

BACKGROUND AND SUMMARY

The statements in this section merely provide background information related to the present disclosure and may not constitute prior art.

A type of a split rotating seal, widely known as a scarf cut plastic seal, is used in many industries and is manufactured by a large number of companies worldwide. This type of seal is used in modern automatic transmissions to seal shafts and clutch components against the passage of hydraulic fluid, usually transmission fluid. An exemplary scarf cut seal is disclosed in U.S. Pat. No. 7,010,844.

In many cases, a scarf cut plastic seal is made from PTFE compound, short slender fibers of glass, graphite or Kevlar, and a number of additives, the amalgam being a homogeneous mixture of PTFE compound, the fibers and additives. A purpose of the fibers is to reinforce the PTFE compound in order to improve its structural properties or to produce a seal whose functional characteristics are particularly suited to an application of the seal or to the environment in which the seal is intended to function. The additives have a similar purpose.

This type of seal typically has a rectangular cross section and a beveled split or scarf cut having an angle in the range of 7-45 degrees when projected on the longitudinal axis of the seal. This type of seal can be installed in an outer groove formed in the outer surface or journal of a rotating or stationary shaft. Alternatively, the seal can be installed in an internal groove formed in a bore of a rotating or stationary housing.

Scarf cut seals tend to loose their cylindrical form due to radial compression, which results in plastic deformation. They become dislocated in the retaining groove due to clearance between the surfaces of the seal and the groove, and they are susceptible to deformation. These factors cause unintended interference between the installed seal and shaft as the shaft is inserted within a bore. The seal is often cut by the shaft during shaft installation, commonly referred to as a "cut seal" condition. Or the seal is unintentionally forced from its groove by the shaft as the shaft slides in the bore past the installed seal.

Accordingly, it is desirable to provide a jointed seal with improved retention characteristics as compared to scarf cut seals. According to the present disclosure, a locking joint seal includes a ring-shaped body made from PTFE, rubber, thermal plastic material, or other known seal materials, and having a first end and a second end. The first and second ends each include mutually engageable first and second locking features. The first locking feature including a first axially extending portion overlapping a second axially extending portion of the second locking feature in an assembled condition.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a side plan view of a locking joint seal having an alternative locking joint design;

FIG. 4 is a side plan view of still another locking joint seal having still another locking joint design; and FIG. 5 is a side plan view of a locking joint seal having still another locking joint design.

DETAILED DESCRIPTION

Figure 1:
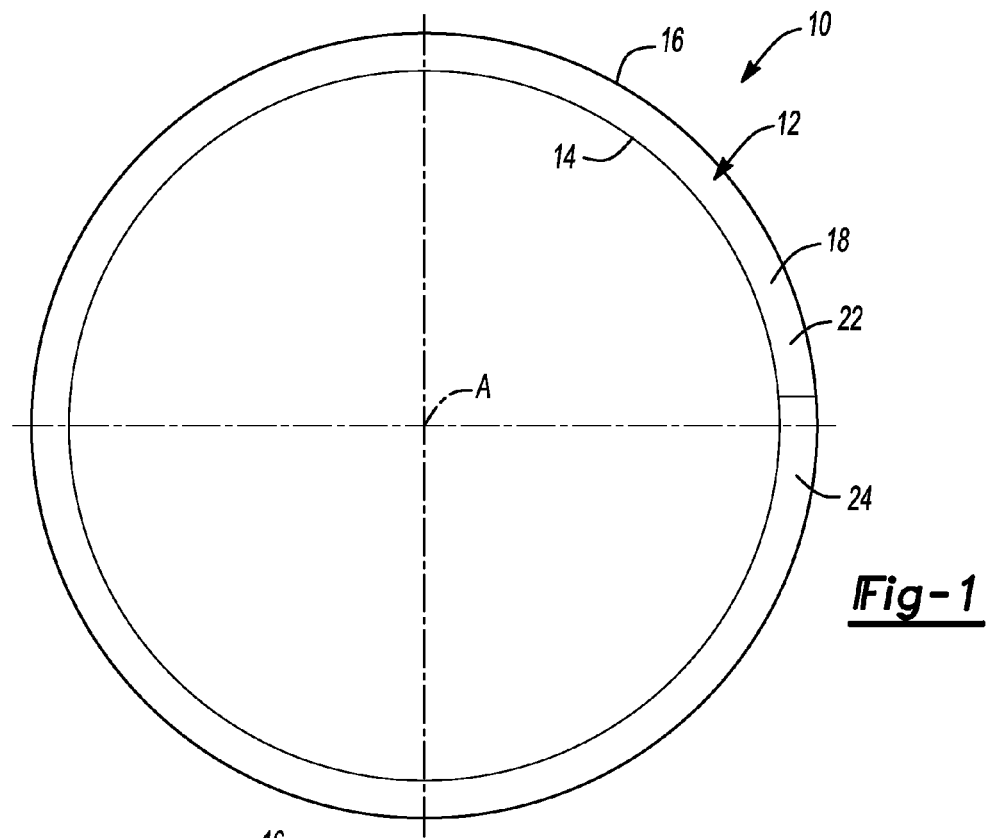
FIG. 1 is a plan view of a locking joint seal according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2A:
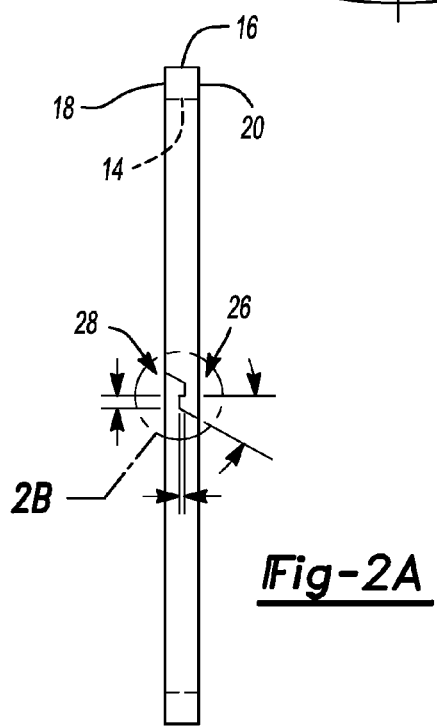
FIG. 2 is a side plan view of a locking joint seal illustrating the locking joint according to the principles of the present disclosure.
Figure 2B:
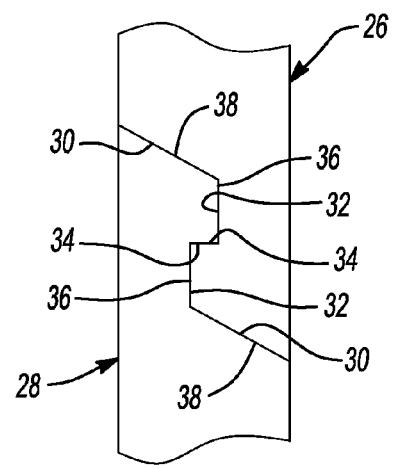

With reference to FIGS. 1 and 2, a locking joint seal 10 according to the principles of the present disclosure will now be described. The locking joint seal 10 includes a ring-shaped body 12 including an inner diameter face 14, an outer diameter face 16 and first and second side faces 18, 20 axially facing in opposite directions. The ring-shaped body 12 includes a longitudinal axis A.

The ring-shaped body 12 includes a first end 22 and a second end 24. The first end 22 includes a first locking feature 26 and the second end 24 includes a second locking feature 28. The first and second locking features can be in the form of first and second hooks. The first and second locking features 26, 28 can each include a hook base surface 30 extending axially from the first side face 18. A first hook inner face 32 is adjacent to the hook base surface 30 and extends generally circumferentially therefrom. An axially extending portion 34 extends from the hook inner face in a direction so as to overlap the hook base surface 30 in an axial direction. A hook side face 36 is adjacent to the axially extending portion 34 and a hook end face 38 extends axially from and adjacent to the hook side face 36 to the second side face 20 of the ring-shaped body 12.

It should be understood that the second locking feature 28 is similarly constructed to the first locking feature 26 as just described. In the assembled condition, the first locking feature 26 engages the second locking feature such that the first hook base surface 30 is disposed adjacent to the hook end face 38 of the second locking feature 28. The hook inner face 32 of the first locking feature 26 is disposed adjacent to the hook side face 36 of the second locking feature 28. The axially extending portions 34 of the first and second locking features are disposed adjacent to one another, the hook side face 36 of the first locking feature 26 is disposed adjacent to the hook inner surface 32 of the second locking feature 28 and the hook end face 38 of the first locking feature 26 is disposed adjacent to the hook base surface 30 of the second locking feature 28.

It should be understood that the hook base surface 30, the first hook inner surface 32, the axially extending portion 34, the hook side face 36 and hook end face 38 can each define planar surfaces as shown, or alternatively, the surfaces can be curved so long as they allow locking engagement between the first and second ends 22, 24 of the ring-shaped body 12.

With reference to FIGS. 3-5, it is illustrated that the surfaces 30-38 can take on many different angular orientations without departing from the spirit and scope of the present disclosure. In particular, as shown in FIG. 3, the hook base surface 130 is at an acute angle relative to the second side face 18 and the hook inner face 132 can be angled relative to the plane of the side face 18. In addition, the axially extending portion 134 can also be angled relative to the longitudinal axis. Furthermore, the hook side face 136 can also be angled relative to the longitudinal axis and the hook end face 138 can be angled at an obtuse angle relative to the side face 20. FIGS. 4 and 5 illustrate further embodiments of the various geometries that can be utilized for the first and second locking features. In particular, FIG. 5 illustrates that the angles provided between each of the surfaces of the locking features can be varied depending upon different applications. FIG. 4 shows a hook base surface that includes a surface 230*a* that is perpendicular to the side face 18 and can include an angled surface 230*b* extending from the surface 230*a*. In addition, the end face can include a surface 238*a* that is perpendicular to the side face 20 and can include an angled surface 238*b* extending from the surface 238*a*.

The method of manufacturing the locking joint seal 10 will now be described. The method of manufacturing includes providing a continuous ring-shaped body which can be formed from PTFE, rubber, thermal plastic material, or other known seal materials, that can include additional fibers and additives as desired for particular applications. The ring-shaped body can be provided with an inner diameter surface, an outer diameter surface and first and second side surfaces. Each of the inner, outer and side surfaces can be generally flat in cross section, or can be provided with a curvature or other undulations. The ring-shaped body is then cut with a blade or other cutting device such as a laser so as to provide the jagged-shaped interface of the first and second ends as described in detail above. In particular, a blade having the jagged configuration of the interface between the first and second ends can be inserted from the outer diameter surface toward the inner diameter surface in order to create the first and second ends 22, 24 which matingly engage with one another as described above.

Comparative leak testing has been performed utilizing the locking joint seal 10 according to the principles of the present disclosure and comparing the results to scarf cut seals and continuous seals. In these comparative tests, the locking joint seals allowed 53% leakage at 76° F. and 40% less leakage at 300° F. than the scarf cut seal, according to the principles of the present disclosure. The continuous uncut seal allowed 65 percent less leakage of oil at 76° F. and 60 percent less of oil leakage at 300° F. than the scarf cut seal, but does not provide for the ease of assembly that is obtained with the locking joint seal or the scarf cut seal. The continuous uncut seal also is also more susceptible to damage during the assembly process which is not a concern with the locking joint seal of the present disclosure. Accordingly, the locking joint seal of the present disclosure provides all of the ease of assembly of the scarf cut seal with improved sealing characteristics. While the locking joint seal allowed slightly more oil leakage than the continuous uncut seal, the continuous uncut seal is subject to damage due to cracking when the seal is stretched during assembled.

What is claimed is:

1. A locking joint seal, comprising:
a ring-shaped body including an inner diameter face, an outer diameter face and first and second side faces axially facing in opposite directions, said ring-shaped body having a first end and a second end, said first and second ends each including mutually engageable first and second locking features preventing said first and second ends from pulling away from one another in a circumferential direction, said first locking feature of said first end having a first axially extending portion overlapping a second axially extending portion of said second locking feature of said second end in an assembled condition, said first locking feature including a first hook base surface extending axially from said first side face, a first hook inner face having a radial extent and adjacent to said first hook base surface, said first axially extending portion adjacent to said first hook inner face, a first hook side face having a radial extent and extending from said first axially extending portion and a first hook end face extending axially from and adjacent to said first hook side face, said second locking feature including a second hook base surface extending axially from said second side face and located adjacent to and abutting said first hook end face, a second hook inner face having a radial extent and adjacent to said second hook base surface, said second axially extending portion adjacent to said second hook inner face, a second hook side face having a radial extent and extending from said second axially extending portion and a second hook end face adjacent to and abutting said first hook base surface and extending axially from and adjacent to said second hook side face, said second hook end face and said first hook base surface each disposed in a plane that is non-perpendicular relative to said first and second side faces of said ring-shaped body.

2. The locking joint seal according to claim 1, wherein in said assembled condition, said first hook inner face is disposed adjacent to said second hook side face, said first axially extending portion is disposed adjacent to said second axially extending portion, and said first hook side face is disposed adjacent to said second hook inner face.

3. The locking joint seal according to claim 1, wherein said first hook base surface, said first hook inner face, said first axially extending portion, said first hook side face and said first hook end face each define planar surfaces.

4. The locking joint seal according to claim 1, wherein said second hook base surface, said second hook inner face, said second axially extending portion, said second hook side face and said second hook end face each define planar surfaces.

5. The locking joint seal according to claim 1, wherein said first axially extending portion and said second axially extending portion each define planar surfaces.

6. The locking joint seal according to claim 1, wherein said first axially extending portion and said second axially extending portion each line a plane that is generally parallel to a longitudinal axis of said ring shaped body.

7. The locking joint seal according to claim 1, wherein said first axially extending portion and said second axially extending portion each line a plane that is angled relative to a longitudinal axis of said ring shaped body.

8. The locking joint seal according to claim 1, wherein said ring-shaped body is made from polytetrafluoroethylene.

9. The locking joint seal according to claim 1, wherein said first hook end face defines a terminal portion of said first end and said second hook end face defines a terminal portion of said second end.

10. The locking joint seal according to claim 1, wherein a circumferential extent of said first hook inner face is approximately equal to a circumferential extent of said second hook side face.

11. The locking joint seal according to claim 10, wherein a circumferential extent of said second hook inner face is approximately equal to a circumferential extent of said first hook side face.

12. The locking joint seal according to claim 1, wherein said first axially extending portion abuts said second axially extending portion.

13. The locking joint seal according to claim 12, wherein said first hook side face abuts said second hook inner face.

14. The locking joint seal according to claim 13, wherein said second hook side face abuts said first hook inner face.

15. The locking joint seal according to claim 1, wherein an angle defined between said first hook inner face and said first hook base surface is greater than 90 degrees.

16. The locking joint seal according to claim 15, wherein said first hook end face and said second hook base surface are each disposed at a non-zero angle relative to the longitudinal axis of said ring-shaped body.

17. The locking joint seal according to claim 16, wherein an angle defined between said second hook inner face and said second hook base surface is greater than 90 degrees.

18. A method of making a locking joint seal, comprising:
forming a continuous ring-shaped body having an outer diameter face, an inner diameter face and first and second side faces facing in opposite axial directions; and
cutting said continuous ring-shaped body in a radially inward direction from said outer diameter face to said inner diameter face to define a first end and a second end on opposite sides of a cut line, said first end defining a first locking feature and said second end defining a second locking feature, said first and second locking features being engageable with each other to prevent said first and second ends from pulling away from one another in a circumferential direction, said first locking feature includes a first hook base surface extending axially from said first side face, a first hook inner face having a radial extent and adjacent to said first hook base surface, said first axially extending portion adjacent to said first hook inner face, a first hook side face having a radial extent and extending from said first axially extending portion and a first hook end face extending axially from and adjacent to said first hook side face, said second locking feature including a second hook base surface extending axially from said second side face and located adjacent to and abutting said first hook end face in an assembled condition, a second hook inner face having a radial extent and adjacent to said second hook base surface, said second axially extending portion adjacent to said second hook inner face, a second hook side face having a radial extent and extending from said second axially extending portion and a second hook end face adjacent to and abutting said first hook base surface in said assembled condition and extending axially from and adjacent to said second hook side face, said second hook end face and said first hook base surface each disposed in a plane that is non-perpendicular relative to said first and second side faces of said ring-shaped body.

19. The method according to claim 16, wherein an angle defined between said first hook inner face and said first hook base surface is greater than 90 degrees.

20. The method according to claim 19, wherein said first hook end face and said second hook base surface are each disposed at a non-zero angle relative to the longitudinal axis of said ring-shaped body.

21. The method according to claim 20, wherein an angle defined between said second hook inner face and said second hook base surface is greater than 90 degrees.

* * * * *

UNITED STATES PATENT AND TRADEMARK OFFICE
CERTIFICATE OF CORRECTION

| | |
|---|---|
| PATENT NO. | : 8,061,716 B2 |
| APPLICATION NO. | : 12/024612 |
| DATED | : November 22, 2011 |
| INVENTOR(S) | : Wirt |

Page 1 of 1

It is certified that error appears in the above-identified patent and that said Letters Patent is hereby corrected as shown below:

Col. 6 line 20 in Claim 19, line 1, "16" should be "18."

Signed and Sealed this
Thirteenth Day of March, 2012

David J. Kappos
*Director of the United States Patent and Trademark Office*